US010228929B2

United States Patent
El-Moussa et al.

(10) Patent No.: US 10,228,929 B2
(45) Date of Patent: Mar. 12, 2019

(54) METHOD AND APPARATUS FOR MODIFYING A COMPUTER PROGRAM IN A TRUSTED MANNER

(71) Applicant: BRITISH TELECOMMUNICATIONS public limited company, London (GB)

(72) Inventors: Fadi Ali El-Moussa, London (GB); Andrew Paverd, London (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 28 days.

(21) Appl. No.: 14/913,773

(22) PCT Filed: Aug. 15, 2014

(86) PCT No.: PCT/GB2014/000315
§ 371 (c)(1),
(2) Date: Feb. 23, 2016

(87) PCT Pub. No.: WO2015/025116
PCT Pub. Date: Feb. 26, 2015

(65) Prior Publication Data
US 2016/0203313 A1 Jul. 14, 2016

(30) Foreign Application Priority Data
Aug. 23, 2013 (GB) .................................. 13250095.0

(51) Int. Cl.
*G06F 21/00* (2013.01)
*G06F 8/65* (2018.01)
(Continued)

(52) U.S. Cl.
CPC ................ *G06F 8/65* (2013.01); *G06F 21/51* (2013.01); *G06F 21/57* (2013.01); *G06F 2221/033* (2013.01)

(58) Field of Classification Search
CPC .... G06F 21/57; G06F 21/565; G06F 11/1433; G06F 21/64; H04L 2209/127
See application file for complete search history.

(56) References Cited

U.S. PATENT DOCUMENTS 5,944,821 A * 8/1999 Angelo .................... G06F 21/51
726/22
6,341,373 B1 * 1/2002 Shaw ....................... G06F 21/57
709/203
(Continued)

FOREIGN PATENT DOCUMENTS

EP 1 887 731 2/2008
EP 2 492 833 8/2012

OTHER PUBLICATIONS

Huh et al, Managing application whitelists in trusted distributed systems, Sep. 26, 2010, Elsevier, 16 Pages.*
(Continued)

*Primary Examiner* — Christopher C Harris
(74) *Attorney, Agent, or Firm* — Nixon & Vanderhye P.C.

(57) ABSTRACT

A computer system having a system memory and being arranged to permit a target program (90) installed on the system to be modified in a trusted manner. The system comprises a White-list Management Agent, WMA, module (10) for receiving, at a notification receiver (12), a notification that the target program (90) which is loaded into the system memory of the computer system has performed an update operation on the target program resulting in the generation and storage of a modified version of the target program on a storage device associated with the computer system. The WMA module is operable, upon receipt of a
(Continued)

target program update notification, to determine if the program (90) as loaded into the system memory is in a trusted state by measuring the program (90) using a program measurer module (14) and comparing this, using a comparator (16), with a pre-stored value contained in a program whitelist (30), the pre-stored value being obtained from the program whitelist (30) using a whitelist reader/writer (18). If the determination is positive, the WMA module (10) generates a hash code of the modified version of the target computer program as stored on the storage device using the program measurer module (14) and stores this generated hash code as a new trusted hash code for the target program in the program whitelist (30), in order to permit subsequent verification of the modified version of the target program as being in a trusted state.

14 Claims, 4 Drawing Sheets

(51) Int. Cl.
G06F 21/57 (2013.01)
G06F 21/51 (2013.01)

(56) References Cited

U.S. PATENT DOCUMENTS

| | | | | |
|---|---|---|---|---|
| 6,694,434 | B1* | 2/2004 | McGee | G06F 21/565 713/182 |
| 7,603,707 | B2* | 10/2009 | Seifert | G06F 21/554 713/164 |
| 8,950,007 | B1* | 2/2015 | Teal | G06F 21/554 726/30 |
| 2003/0097579 | A1* | 5/2003 | England | G06F 21/53 713/193 |
| 2005/0246537 | A1* | 11/2005 | Gunyakti | G06F 21/12 713/176 |
| 2006/0161761 | A1* | 7/2006 | Schwartz | G06F 21/52 711/216 |
| 2008/0104416 | A1* | 5/2008 | Challener | H04L 9/3236 713/189 |
| 2008/0267406 | A1* | 10/2008 | Asokan | H04L 63/12 380/277 |
| 2010/0037065 | A1* | 2/2010 | Dayka | G06F 21/51 713/187 |
| 2010/0293614 | A1* | 11/2010 | Vilppola | G06F 21/51 726/22 |
| 2010/0332848 | A1* | 12/2010 | Adams | G06F 21/629 713/189 |
| 2012/0030731 | A1* | 2/2012 | Bhargava | G06F 21/54 726/3 |
| 2012/0054841 | A1* | 3/2012 | Schultz | G06F 21/44 726/6 |
| 2012/0096450 | A1* | 4/2012 | Schaefer | G06F 21/572 717/168 |
| 2012/0198234 | A1* | 8/2012 | Chung | H04L 9/3247 713/171 |
| 2014/0279985 | A1* | 9/2014 | Fontenot | G06F 21/51 707/698 |
| 2015/0007262 | A1* | 1/2015 | Aissi | G06F 21/60 726/2 |

OTHER PUBLICATIONS

International Search Report for PCT/GB2014/000315 dated Nov. 12, 2014, 4 pages.
European Search Report for EP Application No. 13250095.0 dated Jul. 25, 2014, 10 pages.
Eimear Gallery et al., "Trusted Mobile Platforms", *Foundations of Security Analysis and Design IV*, Aug. 18, 2007, pp. 282-323.

* cited by examiner

METHOD AND APPARATUS FOR MODIFYING A COMPUTER PROGRAM IN A TRUSTED MANNER

This application is the U.S. national phase of International Application No. PCT/GB2014/000315 filed 15 Aug. 2014 which designated the U.S. and claims priority to EP Patent Application No. 13250095.0 filed 23 Aug. 2013, the entire contents of each of which are hereby incorporated by reference.

FIELD OF THE INVENTION

The present invention relates to a method and apparatus for modifying a computer program, particularly in order to permit the program to be updated in a trusted manner which is compatible with "Trusted Computing" methodologies (such as promoted by the Trusted Computing Group). The paper "Trusted Mobile Platforms" by Eimar Gallery et al. published on 18 Aug. 2007 in Foundations of Security Analysis and Design IV; [LECTURE NOTES IN COMPUTER SCIENCE], Springer Berlin Heidelberg, Berlin, Heidelberg, Pages 282-323, XP019099702, ISBN: 978-3-540-74809-0 provides an overview of trusted computing technology and considers the possible applications of this technology in mobile devices, and how these devices can be supported using trusted computing technology, focusing particularly on three mobile applications, namely OMA DRM, SIMLock, and software download.

BACKGROUND TO THE INVENTION

An important aspect of trusted computing is to ensure that software running on a computer is not modified from a version, known (or at least believed) to be safe. The reason for this is that malware often acts by modifying an existing application (e.g. an executable file) and performs malicious acts whenever the modified application is executed (such modification may be either a complete replacement of the legitimate code, an addition to the legitimate code or a partial replacement of some of the code). In order to detect if an application residing on a computer has been modified, a Trusted Platform Module (TPM) stores a hash of all programmes when they are in a state where they are trusted to be clean (i.e. without having any malware code incorporated in any way in the application), this may typically be when they are first loaded onto a system. If one of these applications subsequently becomes infected by a piece of malware, it will necessarily be modified and the hash generated from the modified program will no longer match the stored hash.

In view of the above, a known strategy by which a TPM may detect a potentially suspicious modification is to generate a new hash value for each program (e.g. an executable application, an executable file, a library of functions, a component etc.) whenever it is to be launched and to compare this with a pre-stored hash value (stored in a "white-list" of safe hash values for trusted programs) which is supposed to correspond to the program. If the hash values do not match, the TPM concludes that the software has been modified from the trusted version and could therefore potentially be unsafe, whereupon the computer (system) may take an appropriate course of action (e.g. it may prevent the program from running or from having access to certain resources—such as external network access or write access to a storage device, etc.).

A difficulty with the above described strategy is dealing with legitimate modifications to a program (e.g. to update a complex application). One known prior art approach to address the requirement for legitimate applications to update themselves (from time to time) is to provide a large comprehensive "whitelist library" of acceptable hashes of applications (of many different "versions"). Such a library should be provided and maintained by a trusted third party. If a program is updated to a new version (e.g. from version 5.2 to version 5.3 or to version 6.0 etc.), the TPM can generate a hash code for the updated program and then compare the generated hash code with the comprehensive library containing all acceptable hash codes for legitimate applications maintained by the trusted third party. Only if the generated hash code can be found in the white list library will the modified application be deemed to be trusted.

EP 1 887 731 describes a variant on the above described standard approach in which programs are divided up into smaller chunks each of which has its own associated hash. When a program needs to be updated only the changed chunks are downloaded and replace the corresponding existing chunks. Each of the chunks is then hashed and the locally generated hashes are compared with hashes form the remote trusted server in the normal way.

Problems with this type of approach include the need to have network access to a suitable trusted third party, the complexity of maintaining the external whitelist (and the need for all software producers to deal with a trusted third party maintainer (and possibly several if trusted third parties compete with one another) of the external whitelist library or libraries), the need for a secure connection to be made to a suitable trusted third party and for the trusted third party to be properly authenticated to prevent malicious users from masquerading as a trusted third party, etc. A further problem is a potential delay in being able to use the newly updated application until its newly updated hash has been verified as legitimate, etc. which may take time if no suitable network access is available or if there is a shortage of other necessary resources for this process (e.g. processing power—cryptographic processing power etc.) as might occur where the device in question is a mobile device.

SUMMARY OF THE INVENTION

According to a first aspect of the present invention, there is provided a method of modifying a target computer program installed on a computer system comprising:
  establishing (e.g. by detecting or by being notified) that a modifying application which is loaded into system memory of the computer system has performed an update operation on the target computer program to generate and store a modified version of the target computer program on a storage device associated with the computer system;
  determining if the modifying application as loaded into the system memory and/or the target computer program is in a trusted state (e.g. by generating a hash code of the application as in the system memory and comparing this with a trusted hash code for the application as stored in a locally accessible white list); and, if the determination is positive (i.e. that the modifying application as loaded into system memory and/or the target computer program is in a trusted state),
  generating a hash code of the modified version of the target computer program as stored on the storage device, and storing this generated hash code as a new trusted hash code for the target program (which may conveniently be stored in a locally accessible white list), in order to permit subsequent verification of the modified version as being in a trusted state.

Note that in many cases, the modifying application may be the same as (or at least a part of) the target program itself. In such cases the method becomes a method of modifying a target computer program installed on a computer system comprising (the steps of):

establishing that the target program (which is loaded into system memory of the computer system) has performed an update operation (on itself—or, more precisely, on a copy of the version of itself stored on a data storage device (e.g. a hard disk)) to generate and store a modified version of the target program on a storage device associated with the computer system;

determining whether the target program as loaded into the system memory is in a trusted state (e.g. by generating a hash code of the program as in the system memory and comparing this with a trusted hash code for the program as stored in a locally accessible white list); and, if the determination is positive (i.e. that the target computer program as loaded into the system memory is in a trusted state), generating a hash code of the modified version of the target program as stored on the storage device, and storing this generated hash code as a new trusted hash code for the target program (which may conveniently be stored in a locally accessible white list), in order to permit subsequent verification of the modified version as being in a trusted state.

The rationale underpinning this method of modifying a program (especially in order to update it to a newer version with bug fixes, security enhancements and functional improvements, etc.) is that a trustworthy properly functioning program will not perform a malicious modification of a program (usually itself). Thus provided the method can be fairly certain that it is indeed a trusted program which is performing a program modification, the resulting modified program is unlikely to contain malicious code. Therefore the method provides that a check is made that the program performing a modification is a trusted program. The resulting modified program is then trusted in the form in which it is first modified at least. Enhancements to the method may include monitoring steps taken by the modifying application to ensure that an update is a correct authenticated update and not malicious code masquerading somehow as a legitimate update. The sort of measures which a legitimate updating application may take to ensure the legitimacy of the update could include using an authenticated connection to a trusted provider of the updates (e.g. to a server operated by the organisation responsible for the program) and/or checking a digital signature associated with the update. Thus, where the legitimate updating application is expected to take such measures, a preferred embodiment of a method of the present invention may perform an additional check to ensure that such measures have successfully been taken (e.g. by double checking the digital signature of an applied update). Preferably such measures are ones which can be taken without the need for a network connection to be in place. In respect of a digital signature this can be done so long as the device has a local store of a public key of a signing authority of the update. For example, if a program, PA, is associated with an organisation Org A, a local copy of Org A's public signing key, PuKA, can be kept in a store which is local to the device on which PA is installed. If Org A produces an update file, U1, Org A can sign this with its private key, PrKA. By keeping a copy of Org A's public key, PuKA, locally, if the device has previously received a copy of U1, when it comes to a time for the computer device to apply the update U1 to PA, the device can read the digital signature using the locally stored PuKA and can thereby confirm that the update U1 is the same as that which was originally signed by Org A giving a large degree of trust in the update U1.

Preferred embodiments use a trusted entity in the form of a Whitelist Management Agent (WMA) in order to manage a whitelist of trusted programs. Preferably, only the WMA is able to modify or write to the locally stored whitelist. Furthermore, most preferably, the WMA runs in a separate environment (a trusted execution environment) to the main operating environment of the computer device (i.e. the computer system of the first aspect of the present invention on which the target program is installed). For example, it may be built in functionality built into a Trusted Platform Module (TPM), or it could operate at a BIOS or Hypervisor level or in a separate basic operating system (such as a stripped down linux OS) to which users and external programs do not have ready access, etc. Examples of using such alternative environments in which the WMA may execute in order to make the WMA resistant to malicious attacks and accidental corruptions are given below. Furthermore, similar techniques are described in co-pending published PCT application WO 2013/064799, the contents of which are hereby incorporated in their entirety, and it will be apparent to persons skilled in the art how the techniques taught in this earlier application may be applied to the present invention in preferred embodiments.

It will be noted that the first aspect of the present invention set out above refers separately to system memory and a storage device. The term system memory here refers to memory which is used by the computer system for storing currently executing programs (typically this may be in the form of a fast Dynamic Random Access type of memory to which the computer system's processor has fast access). In particular, this is intended to refer to the memory used by the computer system for holding programs once they have been "loaded" by the "loader" which is another term commonly used in the field of computing. The term storage device on the other hand is used to refer to a permanent memory where programs and data are stored as files using a memory having a suitable file system in place (a typical example of such a permanent storage device would be a hard drive—whether a solid state device or one based on a magnetic disk, etc.). This is where programs and data are stored when they are not loaded into system memory (though of course the actual files from which a program is loaded normally remain in place in the storage device such as a hard disk once a copy of the program has been made and loaded into the system memory). When a program is not in active current use by the computer system (i.e. when it is not loaded into the system memory) it will exist as a file stored on a storage device having an associated file system. The two terms (of system memory and a storage device) as used in the present specification are reasonably clear to a person skilled in the art even though in practice there may be considerable overlap between these concepts when actually implemented (for example, a loaded program may be contained within a file system which also has program and data files in permanent storage and a hard disk may include portions which are used as a "swap space" whereby sections of a virtual system memory are actually stored on a permanent storage device such as a hard disk and swapped into RAM only for when the processor actually needs them, etc.).

Establishing that an update operation has taken place may be done in a number of ways as will be apparent to a person skilled n the art of computer systems. For example, each application could be modified so that as part of performing an update operation it automatically informs the WMA. Alternatively (and perhaps more conveniently), the operating system could be modified by inserting a hook and an intermediate parsing module by which a command to the operating system to perform a write operation to a local storage device (e.g. a hard drive) is first parsed by the intermediate parsing module to identify the file which is to be written. Certain properties of the file could be checked by the module to identify if the write looks like it is implementing a modification of a program file—e.g. if the type of the file is an executable file or a configuration file associated with an executable file. If the module determines that the write request appears to relate to a modification of a program file, it could, for example, pass the details of the modified program (and the identity of the program making the write request) to the WMA for it (the WMA) to take further action—i.e. to carry out the steps of verifying the trustworthiness of the modifying application (the one making the write request) etc.

In preferred embodiments, the process may include rolling back the target program to a previous trusted version in the event that any part of the verification process fails. For example if the WMA determines that either the modifying application or the target program (where these are different) is not currently in a trusted state. This rolling back to a known earlier version of an application or program may be done by keeping a trusted copy of each program/application associated with a whitelist entry in a separate storage location to the standard directory for storing program files for general usage by the (main) operating system, and copying the stored, trusted copy over the untrusted modified version (i.e. over-writing the modified version with the trusted version). Where a program requires a large amount of configuration and related files to be coordinated, it may be that the trusted copy includes an installation script or a similar installer mechanism and rather than simply over-writing a modified executable file the modified program/application is re-installed, etc.

Software whitelisting or software application whitelisting as performed in embodiments of the present invention refers to the use of some form of list (the "whitelist") to specify a subset of pieces of software (software programs or applications which are "executable" rather than simple data files) in order to grant these applications some form of privilege over applications which are not on the whitelist. The privileges granted to whitelisted applications could vary depending on the nature of the system. For example, on some systems, whitelisted applications are known as privileged or trusted applications and have access to functionality not available to ordinary applications (usually hardware-related functionality). In more extreme cases, systems could prohibit applications from executing unless they are on this whitelist, as is the case in preferred embodiments of the present invention.

The mechanism for representing applications on a whitelist also varies depending on the nature of the system. Fundamentally, this mechanism must allow for the unambiguous identification of an application and for differentiation between applications. For example, in some systems (particularly mobile devices), applications are identified by means of a cryptographic signature.

In the trusted computing field, applications are identified by means of a cryptographic hash of the software binary (and possibly also related files such as libraries, configuration files and scripts, etc.). This hash-based mechanism is a very strong form of identification because any change to the application (and/or its configuration where configuration files are also included in the content being hashed, etc.) results in a different identification hash value.

The process of computing the cryptographic hash of the software binary (and, in certain embodiments, its associated components) is referred to here as "measuring" the application. The Linux Integrity Measurement Architecture (IMA) from IBM is an open-source module which can provide this type of hash-based application identification. IMA is part of the mainline Linux kernel albeit it is very seldom used.

From a security perspective, this form of strong identification can be beneficial because it allows detection of changes to the software which may be undetectable by other means. For example, if a piece of malicious software succeeds in embedding itself within another application, it may not be detected when it runs as part of the host application. However, the presence of this malicious software may modify the cryptographic hash value and result in detection if hash-based identification is used.

In preferred embodiments therefore a "Whitelist Enforcement Agent" is additionally used to prevent programs from running at all if a measurement made by the WEA does not match with the value for that program/application as stored in the locally stored whitelist (since it is reasonably safe to assume that it has been modified from its original form in a non-trusted manner). Preferably the WEA has only read access to the local whitelist store (but most preferably only the WEA and the WMA have read access to the stored local whitelist—naturally as mentioned above the WMA also has write access to the whitelist which is not granted to the WEA—this is reasonable since the WEA merely needs to read a hash code from the whitelist and compare it with a recently made measurement of the program that the system is trying to launch/load/execute/run). Preferably, the WEA runs (at least partly) in the main operating system environment of the computer system, so as to minimise any delays in loading a program. However, to prevent an attacker from corrupting the system by first attacking the WEA, suitable precautions may be taken, such as, including a secondary secure WEA which periodically (or from time to time) monitors the WEA itself to ensure that it has not been modified—the secondary secure WEA may run in the same (or a similar) alternative operating/execution environment to that in which the WMA runs. The WEA functionality may conveniently be provided as a conventional part of a TPM in certain embodiments. In a simple to implement embodiment, however, it runs in the same secure simple Linux operating system as the WMA so that the IMA module can be used for both the WMA and the WEA. Naturally this does involve in such a simple embodiment dropping out of the main OS and into the secure Linux OS but it demonstrates the principle—using virtualisation techniques such as those described in WO 2013/064799 discussed above can minimise the disruption to the user without increasing the complexity greatly.

In order to measure an application as loaded into system memory, a suitable third party application may be used such as the application Memoryse provided by the IT security consultancy company Mandiant; suitable techniques for performing this kind of function are described in, for example, published European patent application No. EP 2 492 833, the relevant contents of which are hereby incorporated into the present specification by way of reference. Alternatively, if a hypervisor-plus-virtual-machines approach is being adopted, it is straightforward for an application running at the hypervisor level to read the contents of the virtual memory of a virtual machine in order to measure it. For details on implementing such an approach, please see published patent application EP 2 492 833 referred to above.

An alternative approach is to simply measure the relevant application as stored on the permanent storage in the appropriate file system. The disadvantage of this approach (i.e. that the application as loaded into the system memory (or working memory according to the terminology employed in EP 2 492 833) might be different to the version as stored in the permanent store) can be mitigated by taking a snapshot of the relevant files as they were in existence at the time the application was loaded into system memory so that if the file(s) in permanent storage was (were) changed after the application was loaded into system memory (e.g. by the application itself—if it is operating maliciously—in an attempt to "cover its tracks" from a corrupted (malicious) state to a trusted state) the corrupted state would have been originally copied and if this is measured it will be determined as being a modified and hence untrusted application. This does not, however, mitigate against the possibility of a trusted application being corrupted after it had been loaded into system memory if it was in a trusted state when it was originally loaded into the memory and only corrupted thereafter.

According to a second aspect of the present invention, there is provided a computer system arranged to permit a target program installed on the system to be modified in a trusted manner, the system comprising:
- a White-list Management Agent, WMA, module for receiving a notification that a modifying application which is loaded into system memory of the computer system has performed an update operation on the target program to generate and store a modified version of the target program on a storage device associated with the computer system;
- the WMA module being operable, upon receipt of a target program update notification, to determine if the modifying application as loaded into the system memory (and possibly also the target program) is in a trusted state (e.g. by generating a hash code of the application as in the system memory and comparing this with a trusted hash code for the application as stored in a locally accessible white list) and, if the determination is positive (i.e. that the modifying application as loaded into system memory (and possibly also the target program prior to modification) is in a trusted state), to generate a hash code of the modified version of the target computer program as stored on the storage device and to store this generated hash code as a new trusted hash code for the target program (which may conveniently be stored in a locally accessible white list), in order to permit subsequent verification of the modified version of the target program as being in a trusted state.

The computer system may further include a parsing module for intercepting calls to the main operating system requesting a write operation to be performed on the main storage device (e.g. a hard drive) of the computer system as described above (for use with implementations where the modifying programs themselves do not directly notify the WMA when an update has been performed).

Embodiments of the present invention may further include a Whitelist Enforcement Agent, WEA, module which enforces specified lack of privileges to programs which are not determined as being trusted after a comparison, with the Whitelist. Most preferably, programs which do not pass the comparison are simply not permitted to be loaded into system memory and run at all.

In preferred embodiments, the WMA module is implemented in a separate piece of hardware which is physically separated from the main processor of the computer system. In a particularly preferred such embodiment, the WMA is implemented in a Trusted Platform Module (TPM) which itself is implemented as such a physically separated piece of hardware. However, in alternative embodiments, the functionality could be implemented using alternative technologies, such as for example, those used in implementing virtual TPM modules (see for example U.S. Pat. No. 7,603,707 B2 by Google Inc concerning a virtual TPM implemented on a multi-threaded processor architecture). In embodiments including a WEA module, the WEA module is also preferably implemented in the same manner as the WMA (i.e. in a physically separate piece of hardware and/or in a TPM (either physical or virtual). Preferably, the WMA (and the WEA) run in a secure alternative operating environment which can run in parallel to the main operating system environment to prevent the system from having to drop out of the main operating system environment (or at least not in a way which significantly impacts on the user's experience).

According a to a third aspect of the present invention, there is provided a trusted platform module for use in a computer system arranged to permit a target program installed on the system to be modified, the trusted platform module comprising:
- a White-list Management Agent, WMA, module for receiving a notification that a modifying application which is loaded into system memory of the computer system has performed an update operation on the target program to generate and store a modified version of the target program on a storage device associated with the computer system;
- the WMA module being operable, upon receipt of a target program update notification, to determine if the modifying application as loaded into the system memory (and possibly also the target program) is in a trusted state (e.g. by generating a hash code of the application as in the system memory and comparing this with a trusted hash code for the application as stored in a locally accessible white list) and, if the determination is positive (i.e. that the modifying application as loaded into system memory (and possibly also the target program prior to modification) is in a trusted state), to generate a hash code of the modified version of the target computer program as stored on the storage device and to store this generated hash code as a new trusted hash code for the target program (which may conveniently be stored in a locally accessible white list), in order to permit subsequent verification of the modified version of the target program as being in a trusted state.

Further aspects of the present invention relate to a computer program or programs for carrying out the method or methods of other aspects of the present invention (including the first aspect) and to carrier media, preferably non-transient carrier media such as optical or magnetic storage devices or solid state storage devices etc.

BRIEF DESCRIPTION OF THE DRAWINGS

In order that the present invention may be better understood, embodiments thereof will now be described, by way of example only, with reference to the accompanying drawings in which.

DETAILED DESCRIPTION OF SPECIFIC EMBODIMENTS

Figure 1:
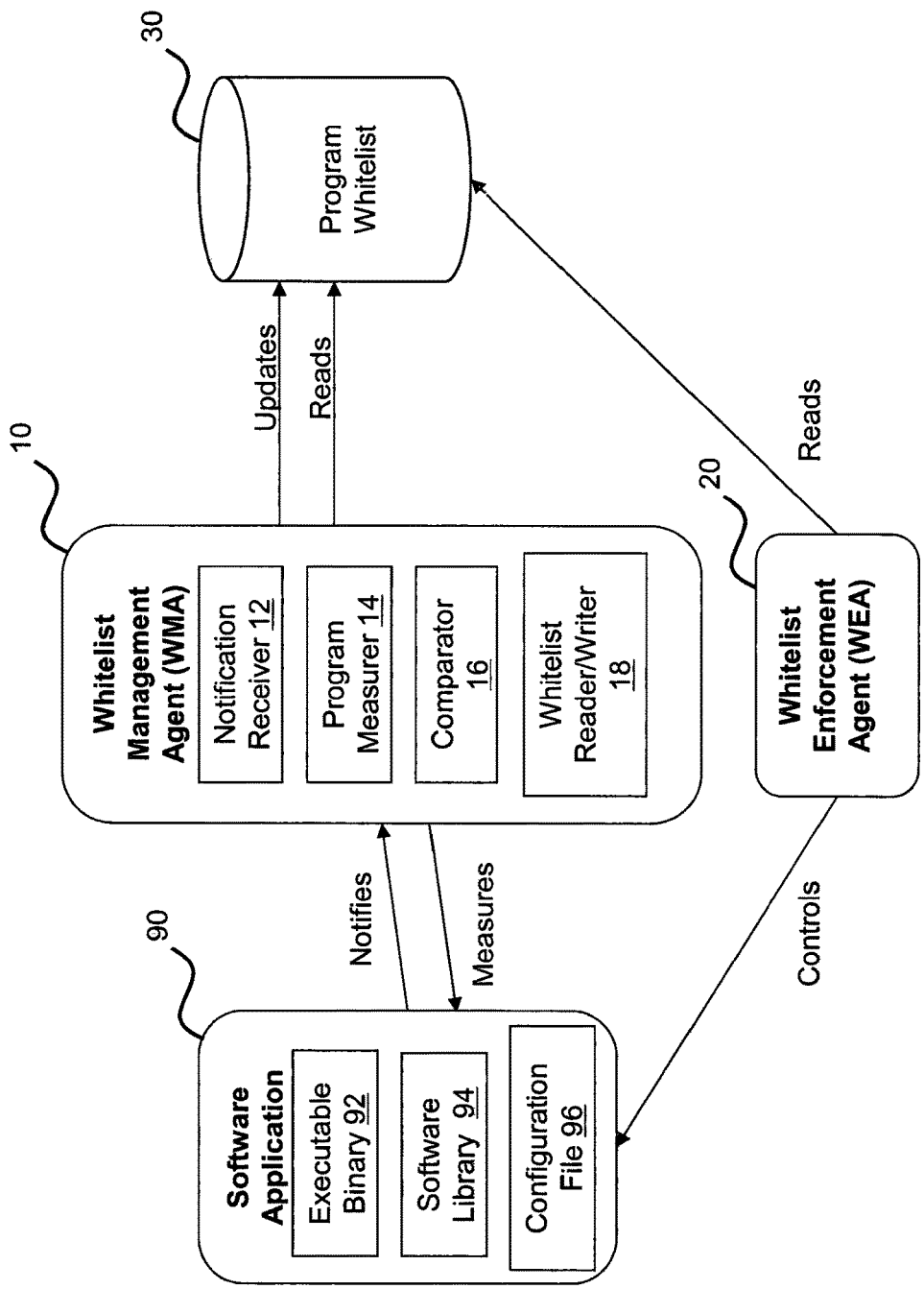
FIG. 1 is a schematic overview of the functional modules making up embodiments of the present invention.

As shown in FIG. 1, the principal functional modules of some example embodiments of the present invention include a Software Application 90 (which consists of multiple components including one or more executable binary files 92 (e.g. x.EXE files), one or more software libraries 94 (e.g x.DLL files) and one or more configuration files 96 (e.g x.XML files)—changes to any of which result in a different hash value when the application is measured using the IMA discussed above or similar alternative tools); a Whitelist Management Agent (WMA) 10 (which in some embodiments—as shown in FIG. 1—consists of a notification receiver 12, a program measurer 14, a comparator 16 and a whitelist reader/writer 18); a Whitelist Enforcement Agent (WEA) 20 and a program whitelist 30.

The above set out components of embodiments of the present invention of particular pertinence to the present invention are:

The Application Whitelist 30 which stores the trusted applications (or more precisely identifications thereof) together with their associated hashes.

The Whitelist Enforcement Agent (WEA) 20 which is a component which controls what privileges are given to programs which the system 100 attempts to load for execution, most typically the privilege of being able to run at all. Such systems already exist (e.g. secure boot implemented in trusted computing)—however, embodiments of the present invention use such components/functional modules to control the execution (or not) of applications/programs. The functionality of the WEA is to measure a program/application that is about to be loaded/executed and to compare the measurement result (e.g. a hash) with the corresponding measurement (e.g. a hash) for the program/application as stored in the whitelist 30.

The Whitelist Management Agent (WMA) 10 which is a non-conventional component which manages the updating of the whitelist 30. The WMA 10 also uses the whitelist 30 for this process. As shown in FIG. 1, in embodiments of the present invention, the WMA 10 includes a notification receiver 12 for receiving notifications that a software application 90 has attempted (or is about to attempt or is currently attempting) to modify a program or application (which may often be itself)—such modification normally being an update to the program to update to a newer version. In addition the WMA 10 includes a program measurer 14 (e.g. the IMA or similar tools as discussed above), a comparator 16 (for comparing a measurement performed by the program measurer 14 and a corresponding measurement stored in the whitelist 30), and a whitelist reader/writer for reading from and writing to the whitelist 30.

In embodiments implementing the functionality illustrated in FIG. 1, the application whitelist 30 can only be modified (i.e. be written to and have deletions made from) by the WMA 10. The WMA 10 is itself (in such embodiments) a trusted component which executes in a trusted execution environment. This trusted execution environment is enforced in such embodiments by the system hardware and/or software in such a way that the execution of the WMA cannot be influenced by any other software which has been run or is running on the system according to known procedures associated with trusted computing methodologies. The procedure for updating the whitelist after an application update as adopted by embodiments of the present invention implementing the functionality illustrated in FIG. 1 is described in the next section.

Figure 2:
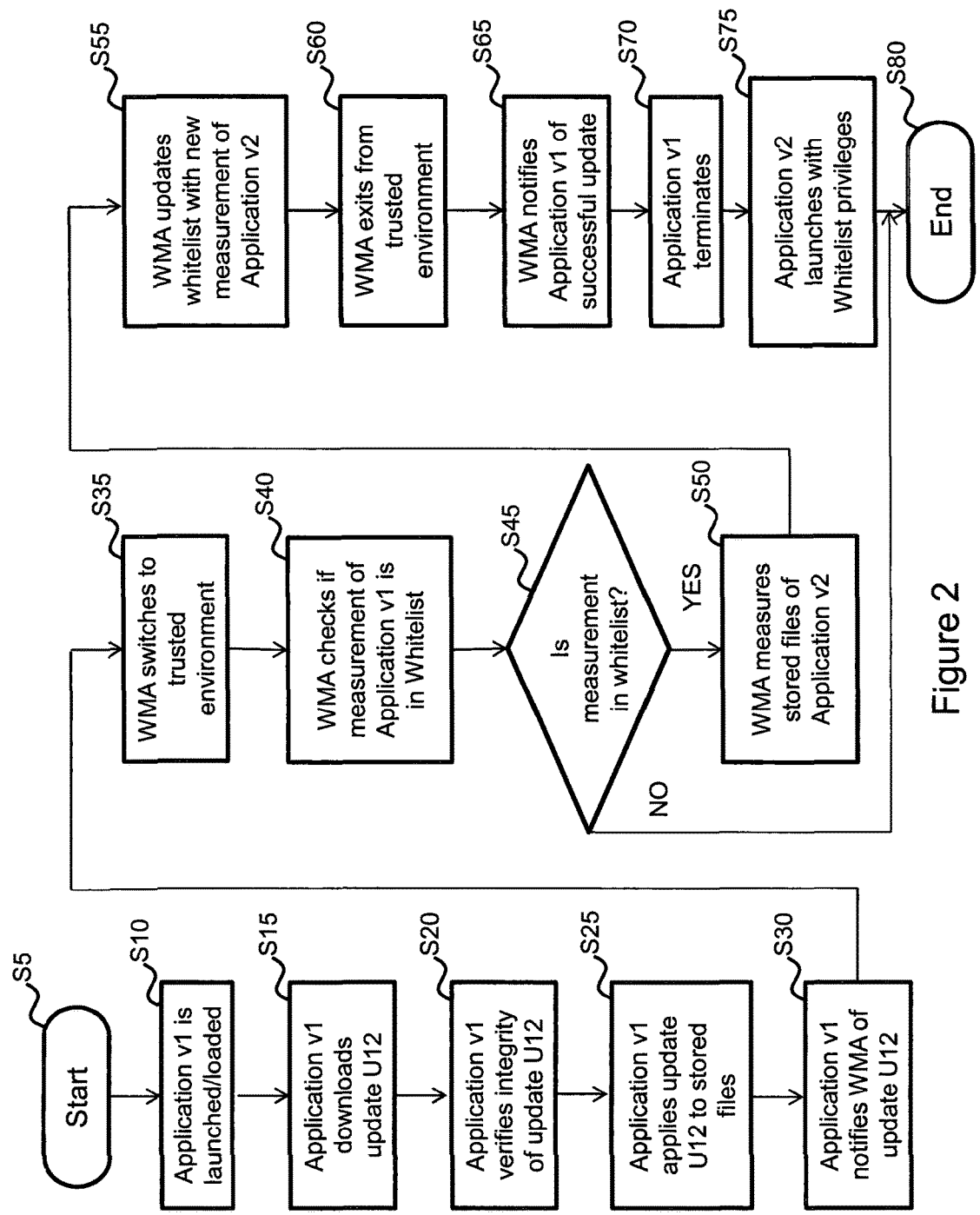
FIG. 2 is a flow chart showing in overview principal processes to be carried out by the functional modules of FIG. 1.

Updating the Whitelist Process:

The sequence of events for an application update when performed in a computer system implementing the functionality illustrated in FIG. 1 is shown in FIG. 2.

As illustrated, the sequence of events includes a first set of events which occur within the main execution environment, a second sequence of events which occur within the secure execution environment and a third sequence of events which occur within the main execution environment again. The figure indicates only a single complete sequence (of steps S5 to S70 associated with a successful update)—the changes to this which would occur in the event of some unexpected or seemingly malicious occurrence are discussed separately below.

In FIG. 2, steps S5-S20 and steps S65-S70 inclusive are actions which may be considered as conventional whilst steps S25-S60 inclusive are non-conventional.

Figure 3:
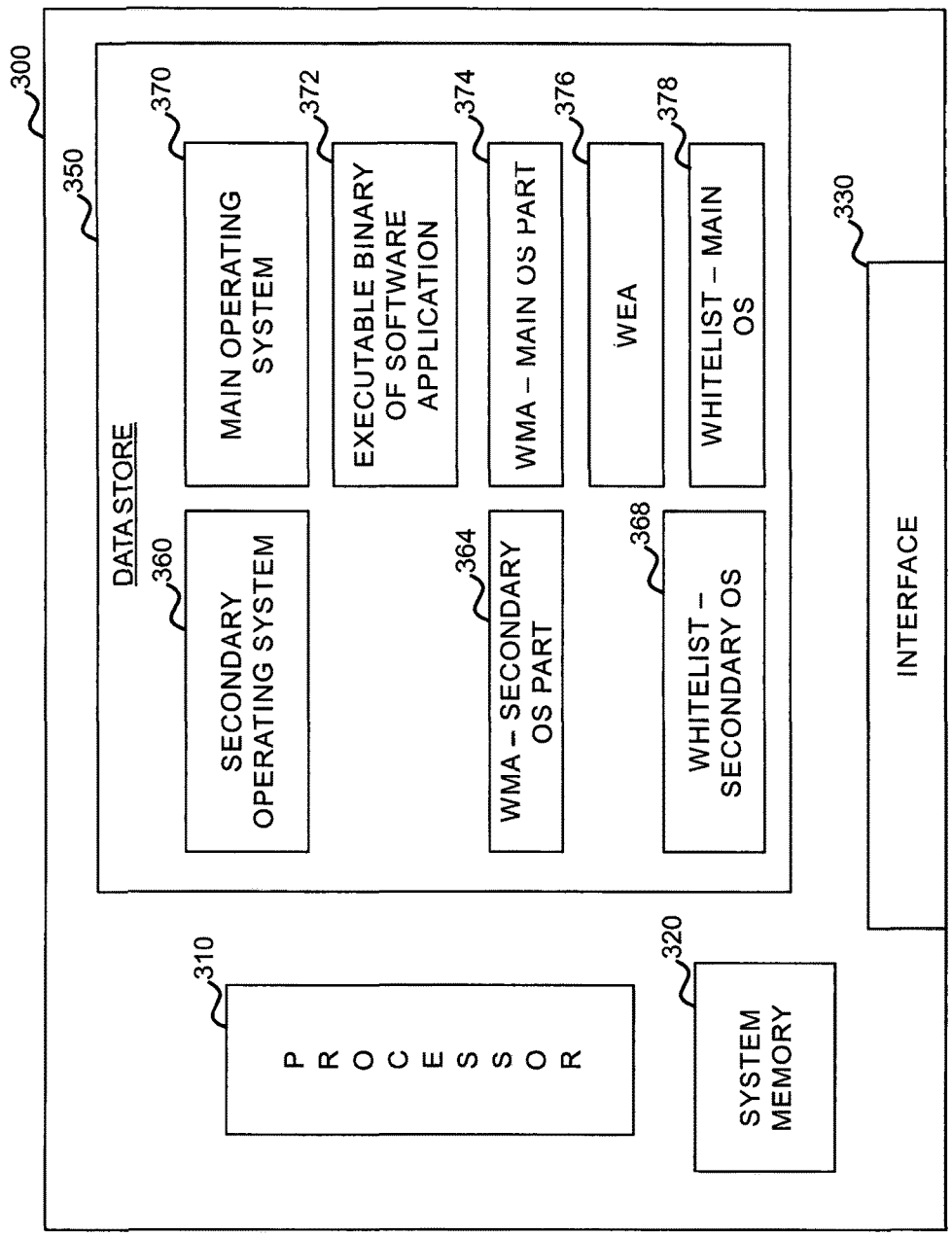
FIG. 3 is a schematic architectural overview of a computer system implementing the functional modules of FIG. 1 according to a first implementation.

The procedure can be described as follows: First, upon commencement of the process at S5, an initial version of an application, Application v1, is launched at S10. This application, v1, receives an update notification from the vendor as usual and, also as usual, it downloads, at S15, a file containing the relevant update, update U12. The update U12 is intended to update the application from a version v1 to a new version v2 (i.e. from Application v1 to Application v2). Application v1 (in the present embodiment) verifies the integrity of the update, U12, as usual (any conventional approach for doing this can be used—typically this would involve checking that the update is signed by the vendor) at S20. Application v1 then applies the update U12 to its files stored in non-volatile storage as usual at S25. Application v1 then, in some embodiments, notifies the WMA 10 of having performed this update at S30 (note that the way in which the notification is performed depends upon the particular implementation—it could be functionality built into the application; moreover, in alternative embodiments a notification could be delivered to the WMA in an alternative manner, such as by building a hook into the operating system which captures all requests to save a file to permanent storage and notifies the WMA 10 if the request is to save a program or executable file, etc. Such a hook could additionally not carry out any actual save in respect of programs which trigger a notification to the WMA until receiving confirmation back from the WMA that it is clear to do so.) Upon receiving this notification at S30, WMA 10 switches to a trusted execution environment at S35. Note that the way in which this action (of switching to a trusted execution environment) is performed is strongly dependent upon the form of implementation employed—for example, in a simple implementation such as illustrated in FIG. 3 and as described below with reference to FIG. 3, this step may include an agent running in the main operating system environment causing the main operating system environment to go into a hibernation mode—after storing certain data required by the part of the WMA 10 which executes in a secure execution environment—and then causing the system to reboot into a secure Linux operating system execution environment and executing the part of the WMA 10 that operates in this secure Linux environment, whereas other implementations may simply pass an appropriate message/notification to the agent which is constantly running on a separate piece of hardware such as one forming a TPM, etc.

Once the (part of the) WMA 10 running in a secure execution environment has control, following completion of S30 and S35, then the WMA 10, at S40, uses its program measurer 14 (e.g. the IMA or an equivalent tool) to "measure" (i.e. to calculate a hash value of) the application (either according to a version of the application as it was stored in permanent storage—e.g. on a hard disk—just before it was run/executed/(up)loaded into memory or according to a version of the program as actually loaded into system memory when it was detected as having updated the application v1 to application v2 using the update U21) and then checks (using its comparator 16) this measurement result/hash with the corresponding hash for application v1 as stored in the program whitelist 30—to obtain the corresponding measurement value/hash stored in the whitelist 30, the WMA uses its Whitelist Reader/Writer 18. Then, at S45, the WMA 10 determines if the obtained stored measurement/hash of Application v1 in the whitelist matches the measurement of Application v1 just obtained by the program measurer component 14. If the values do not match, the WMA 10 terminates the process (jumping straight to the end S80) without modifying the whitelist and raises a system alert. If at S45 however the measurement of Application v1 is found to match that stored in the whitelist 30, then the WMA 10 continues with the procedure by proceeding to S50.

Since the updating of application v1 performed at S25 results in a modification of its binary execution file, (or in some embodiments of an associated software library and/or an associated configuration file) that is stored in a permanent storage device such as a hard-drive, once the application v1 is restarted it will actually use the new file application v2. In order, therefore, for the application v2 measurement/hash to get into the whitelist 30, the IMA (or similar tool) measures (i.e. calculates a hash of) the new file application v2 as stored on the permanent storage device (e.g. hard drive) at step S50 and updates, at step S55, the measured measurement/hash in the whitelist 30 for application v1. Before the WEA 20 will permit, in the present embodiment, application v2 to be launched and run, it will seek to confirm that the hash for application v2 be stored already in the whitelist. However, since the whitelist still has the hash of the application v1 before the update, the IMA calculates the hash of the file binary (and/or any other associated files in some embodiments) after the update (which can be performed while the application v1 is still running) and the calculated hash of the modified v2 version is stored in the whitelist 30. Furthermore, the new measurement value/hash replaces (at S55) the hash for the application v1/v2. So that when the application v2 runs then it has its measurement value/hash in the whitelist 30.

Therefore, the WMA takes a measurement of the new files which Application v1 has updated, which constitute Application v2 at S50. This measurement is then stored in the Whitelist 30 by replacing the measurement for Application v1 (at S55).

Once this has been completed, the WMA 10 exits from the trusted environment (at S60) (which is basically just a reverse of S35 and thus in some embodiments involves exiting the secure execution environment and re-booting back to the main execution environment as necessary and then passing control immediately to a part of the WMA which runs in the main execution environment and can control a smooth return back to the operation of the application v1) and notifies Application v1 (which may still be running—or which may have resumed running when the main execution environment was re-entered)) that the update has been completed successfully (at step S65). Application v1 then terminates as usual at S70. The next time this application (now updated to application v2) is launched, the binary files will correspond to Application v2 because of the normal update procedure and the Whitelist entry will also correspond to Application v2 because of this update procedure such that at S75 the updated Application v2 can launch with appropriate permissions, etc.

The procedure can be repeated indefinitely as an application is updated. This essentially builds a chain of trust from the initial version of the application through to the current version by keeping the whitelist values synchronized to the hash-based measurement of the current version of the application.

Example Implementations

FIG. 3 illustrates one possible example implementation of the system and process illustrated above in FIGS. 1 and 2. As shown in FIG. 3 a typical computer system 300 is illustrated having a Processor 310, System Memory 320, an interface 330 and a Data Store 350 (e.g. a hard drive). These components are all conventional and they will not be described in greater detail except as is pertinent to the present embodiment. In order to implement the functionality of embodiments of the present invention in this system, the Data Store includes the following computer program/code elements and data files: A Secondary Operating System 360 which in the present case is a simple Linux Operating System (OS), a Whitelist Management Agent (WMA)—secondary OS part (i.e. a part of the WMA that operates in the secondary OS) 364 and a Whitelist—Secondary OS data file 368. In addition, the Data Store 350 additionally includes the following Main OS computer program/code elements and data files: a Main OS 370 (which may be a Linux OS or a proprietary OS such as Windows 7 or Windows 8 by Microsoft Inc.), an executable binary of a software application 372 (e.g. the executable binary 92 of Application v1 90 referred to above with reference to FIGS. 1 and 2), a WMA—Main OS part 374, a WEA 376 and a Whitelist—Main OS data file 378.

As will be appreciated by persons skilled in the art the data store can contain a portion on which the secondary OS 360 and associated files (including the WMA—Secondary OS part 364, WEA—Secondary OS part 366 and the Whitelist—Secondary OS 368) are held which is hidden from the Main OS when it is running. Additionally, for reasons that will become apparent below, in the present example implementation, the Whitelist—Secondary OS 368 includes a copy of each application together with its associated hash or measurement, whereas the corresponding whitelist 378 associated with the Main OS (and stored on a part of the data store which is accessible to the Main OS) need only store a copy of each hash/measurement together with a corresponding identifier for the program with whose hash/measurement it is associated, although if space is not a concern the identifier could of course be a complete copy of the program such that the Main and secondary OS whitelists 378 and 368 would then be identical (except for during an update of the whitelists or if the Main OS whitelist becomes corrupted in some way).

When the system is operating normally, with the Main OS booted up and running, a request by the user to launch the executable binary 372 triggers the WEA—Main OS part 376 to perform a check to ensure that the hash of the executable binary is stored in the Whitelist—Main OS 378. (The triggering can be performed in any appropriate manner—e.g. by the WEA having a hook into the Main OS by which all requests to the OS to launch a program are intercepted firstly by the WEA which then decides whether or not to forward on the request directly to the OS for further processing.) Assuming the check succeeds, the Executable is launched (which includes loading a copy of the executable into the system memory 320). If the executable program (as part of its standard functionality) establishes that it has an update ready to download and install, then it attempts to do this. This process ultimately results (in a normal case) in the executable attempting to write over the stored executable file 372 in the data store 350 (with the updated binary for the executable). That request then triggers the WMA—Main OS part 374 to respond to this request by storing a copy of the amended executable binary file intended to be written over the current binary file 372 on a portion of the data store 350 which is accessible to the secondary OS (which may be the entirety of the data store 350) and then to cause the Main OS to enter a hibernation state (whereby all current states of all programs running on the main OS are stored such that the overall state of the Main OS and all running programs can be resumed when the Main OS is re-entered following hibernation) and then to cause the system to reboot into the secondary OS (this is readily achievable using functionality provided by Windows Powershell and a powerful boot loader tool such as GRUB2 with state memory and simple scripting features) whereupon the WMA and WEA secondary OS parts 364, 366 load and run.

The WMA—Secondary OS part 364 measures the executable binary 372 (i.e. application v1) as stored on the Data Store 350 and confirms that it corresponds with its currently stored measurement in the whitelist—secondary OS 368 (c.f. S40 and S45 in FIG. 2). If it cannot confirm this (i.e. the measurement does not generate the expected hash as stored in its secondary OS whitelist 368), then it can ensure that the update is not accepted—e.g. by overwriting the prestored amended executable with a copy of the executable as stored in the secondary OS whitelist (which is a trusted version of this executable and corresponds to the stored whitelist)—the result of which will be that when the Main OS is reloaded the executable stored on the data store will be overwritten with the trusted version that the WMA took from its (secure) whitelist. If, on the other hand, the WMA does confirm that the measurement of the executable binary 372 does match the value (hash/measurement) in its whitelist 368, then the WMA—Secondary OS part 364 measures/generates a hash of the pre-stored copy of the modified executable file generated by the update process performed by the loaded version of the executable application running from the system memory 320—c.f. S50 of FIG. 2. The WMA 364 then overwrites its whitelist 368 with both the new hash/measurement value and the associated new updated executable binary, and then it performs a corresponding update of the whitelist—Main OS 378 so that it is synchronised with the whitelist—secondary OS 368 (c.f. S60 of FIG. 2).

Note that as an additional check, the WMA—Secondary OS part 364 can perform some additional security checks whenever it is active (or from time to time when it is active) including confirming that the entirety of the whitelist—Main OS 378 corresponds with the Whitelist—Secondary OS 368, and to check that the WEA 376 is in a trusted state by comparing its executable binary program file 376 as stored in the data store 350 with the version of this which it has stored in its whitelist 368 (e.g. by generating a hash for it and comparing this with its stored hash in the whitelist). Again—if it finds that the WEA appears to have been corrupted because it does not match with the version stored in its whitelist 368 it can simply overwrite the WEA executable file 376 with the trusted version that it has in its whitelist. And any discrepancy between the two whitelists can similarly be repaired by using the contents of the whitelist—Secondary OS 368 to replace mis-matching parts of the Whitelist—Main OS 378.

When all of the actions performed by the WMA—Secondary OS part 364 have been completed, the secondary OS is exited and the Main OS is re booted into (bringing the Main OS out of hibernation) (c,f, S60 of FIG. 2). The WMA which was running when hibernation was entered restarts where it left off, performs the over-writing of the pre-stored updated version of the executable application (e.g. application v2 if all has gone well). Finally it informs the application v1 (as it is still running in the system memory) that the update has completed successfully whereupon it can close down and relaunch itself as the new version. When it does so the WEA 376 should confirm that it is permitted to do so because its new measurement/hash is stored in the whitelist—Main OS 378 which is readable by the WEA 376.

Figure 4:
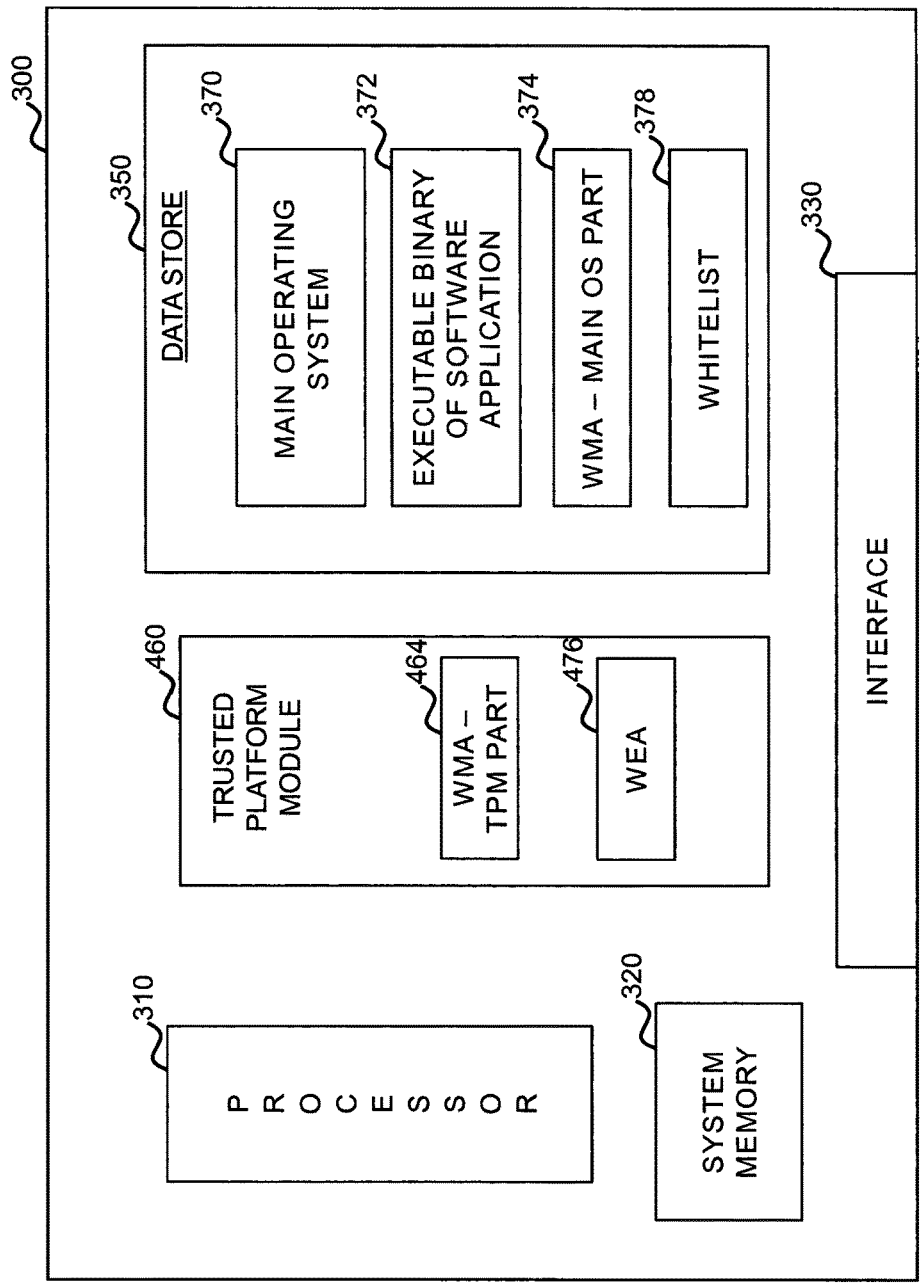
FIG. 4 is a schematic architectural overview of a computer system implementing the functional modules of FIG. 1 according to an alternative implementation.

A disadvantage with the above implementation is that it is necessary to boot in and out of different operating systems to provide the separate execution environments. This could be solved either by using a hypervisor architecture where the Main OS is run as an application within a hypervisor and the hypervisor itself provides the secondary Operating System (this gives rise to a further advantage that it becomes easy to measure the version of an application as it is currently running in system memory (virtual system memory in such a case) rather than just measuring a copy of the executable binary file as it is stored in a data store such as a hard drive). Alternatively, as illustrated in FIG. 4, a Trusted Platform Module 460 could be used to provide a secondary execution environment and a WMA—Secondary execution environment part 464 (corresponding to the secondary OS 360 and the WMA—Secondary OS part 364 respectively). In such an embodiment it may also be possible to have just a single whitelist 478 with write access given only to the TPM 460. Furthermore, the WEA may be implemented as a function 476 within the TPM as well.

In alternative implementations, the TPM 460 could be a virtual TPM.

The present disclosure additionally comprises the following clauses:

1. A method of modifying a target computer program installed on a computer system and stored on a storage device associated with the computer system, the computer system having system memory, the method comprising:
   establishing that a modifying application which is loaded into the system memory of the computer system has performed an update operation on the target computer program to generate and store a modified version of the target computer program on the storage device associated with the computer system; characterised by determining if the modifying application is in a trusted state; and, if the determination is positive, generating a hash code of the modified version of the target computer program as stored on the storage device, and storing this generated hash code as a new trusted hash code for the target program, in order to permit subsequent verification of the modified version as being in a trusted state.

2. A method according to clause 1 wherein the modifying application is a copy of the target computer program having been loaded into the system memory.

3. A method according to either preceding clause wherein establishing that an update operation has been performed comprises generating a notification of the performance of the update and passing this to a whitelist management agent which is operable to determine if the modifying application is in a trusted state or not, and if it is, to generate and store the hash code of the modified version of the target program.

4. A method according to clause 3 wherein the whitelist management agent executes in a separate execution environment to that in which the modifying application, which may be the target computer program, executes.

5. A method according to clause 3 wherein the whitelist management agent executes within a trusted platform module.

6. A method according to clause 5 wherein the trusted platform module is a virtual trusted platform module.

7. A module (460) for use in a computer system (300), the computer system having system memory (320) into which is loaded a modifying application which is operable to modify a target computer program (372) stored on a storage device (350) associated with the computer system, the module (460) comprising:

means for receiving a notification that the modifying application has performed an update operation on the target computer program to generate and store a modified version of the target computer program on the storage device associated with the computer system;

means for determining if the modifying application is in a trusted state;

means for generating a hash code of the modified version of the target computer program as stored on the storage device, if the determination of the determination means is positive; and means for storing the generated hash code as a new trusted hash code for the target program, in order to permit subsequent verification of the modified version as being in a trusted state.

8. A module (460) according to clause 7 wherein the module is a trusted platform module.

9. A module (460) according to clause 8 wherein the module is a virtual trusted platform module.

10. A module according to any one of clauses 7 to 9 wherein the receiving means, the determining means, the hash code generation means and the hash code storage means comprise a white list management agent (464).

11. A computer system (300) having system memory (320), loaded into which is a modifying application which is operable to modify a target computer program (372) stored on a storage device associated with the computer system, wherein the computer system further includes a module (460) according to any one of clauses 7 to 10.

12. A computer system according to clause 11 further comprising means for establishing that a modifying application which is loaded into the system memory of the computer system has performed an update operation on the target computer program to generate and store a modified version of the target computer program on the storage device associated with the computer system and for sending a corresponding notification to the receiving means of the module.

13. A computer system according to clause 12 wherein the establishing means comprises a parsing module for intercepting calls, to a main operating system executing on the computer system, requesting a write operation to be performed on the storage device associated with the computer system.

14. A carrier medium carrying processor implementable instructions for causing the method of any one of clauses 1 to 6 to be carried out during execution of the instructions.

The invention claimed is:

1. A method of modifying a target computer program installed on a computer system and stored on a storage device associated with the computer system, the computer system having system memory, the method comprising:

establishing that a modifying application which is loaded into the system memory of the computer system has performed an update operation on the target computer program, the update operation including generation of a modified version of the target computer program and storage of the modified version of the target computer program on the storage device associated with the computer system;

determining if the modifying application is in a trusted state after establishing that the modifying application has performed the update operation; and upon determination that the modifying application is in the trusted state after establishing that the modifying application has performed the update operation, generating a hash code of the modified version of the target computer program as stored on the storage device, storing this generated hash code as a new trusted hash code for the target program, and subsequently verifying the modified version as being in a trusted state based on the new trusted hash code.

2. A method according to claim 1 wherein the modifying application is a copy of the target computer program having been loaded into the system memory.

3. A method according to claim 1 wherein establishing that an update operation has been performed comprises generating a notification of the performance of the update and passing this to a whitelist management agent which is operable to determine if the modifying application is in a trusted state or not, and if it is, to generate and store the hash code of the modified version of the target program.

4. A method according to claim 3 wherein the whitelist management agent executes in a separate execution environment to that in which the modifying application executes.

5. A method according to claim 3 wherein the whitelist management agent executes within a trusted platform module.

6. A method according to claim 5 wherein the trusted platform module is a virtual trusted platform module.

7. A computer system arranged to permit a target program installed on the computer system to be modified in a trusted manner, the computer system comprising:

a system memory for storing at least a modifying application;

computer processing hardware configured to:

receive a notification that the modifying application which is loaded into the system memory of the computer system has performed an update operation on the target program, the update operation including the generation and storage of a modified version of the target program on a storage device associated with the computer system;

upon receipt of a target program update notification, determine if the modifying application as loaded into the system memory is in a trusted state; and upon determination that the modifying application as loaded into the system memory is in the trusted state, generate a hash code of the modified version of the target computer program as stored on the storage device, store this generated hash code as a new trusted hash code for the target program, and subsequently verifying of the modified version of the target program as being in a trusted state based on the new trusted hash code.

8. A computer system according to claim 7 wherein the computer processing hardware is further configured to intercept calls, to a main operating system executing on the computer system, and request a write operation to be performed on the storage device associated with the computer system.

9. The computer system according to claim 7, wherein the computer processing hardware is further configured to implement a virtual trusted platform for executing the receipt of the notification, the determination that the modifying application is in the trusted state, and the generation of the hash code.

10. The computer system according to claim 7, further comprising a main processor which is a physically separate piece of hardware from the computer processing hardware configured to receive the notification, determine that the modifying application is in the trusted state, and generate the hash code.

11. Computer processing hardware for implementing a trusted platform module for use in a computer system arranged to permit a target program installed on the computer system system to be modified, the computer processing hardware for implementing the trusted platform module providing processing comprising:

receive a notification that a modifying application which is loaded into system memory of the computer system has performed an update operation on the target program, the update operation including generation of a modified version of the target computer program and storage of the modified version of the target program on a storage device associated with the computer system;

upon receipt of a target program update notification, determine if the modifying application as loaded into the system memory is in a trusted state; and upon determination that the modifying application as loaded into the system memory is in the trusted state, generate a hash code of the modified version of the target computer program as stored on the storage device, store this generated hash code as a new trusted hash code for the target program, and subsequently verifying of the modified version of the target program as being in a trusted state based on the new trusted hash code.

12. The computer processing hardware according to claim 11, wherein the computer processing hardware is further configured to implement a virtual trusted platform module as the trusted platform module for executing: the receipt of the notification, the determination that the modifying application is in the trusted state, and the generation of the hash code.

13. The computer processing hardware according to claim 11, wherein the computer processing hardware implementing the trusted platform module is a physically separate piece of hardware from a main processor of the computer system.

14. A non-transient carrier medium carrying the processor implementable instructions which upon execution by a computer processing system, performs steps of modifying a target computer program installed on a computer system and stored on a storage device associated with the computer system, the computer system having system memory, the steps comprising:

establishing that a modifying application which is loaded into the system memory of the computer system has performed an update operation on the target computer program, the update operation including generation of a modified version of the target computer program and storage of the modified version of the target computer program on the storage device associated with the computer system;

determining if the modifying application is in a trusted state after establishing that the modifying application has performed the update operation; and upon determination that the modifying application is in the trusted state after establishing that the modifying application has performed the update operation, generating a hash code of the modified version of the target computer program as stored on the storage device, storing this generated hash code as a new trusted hash code for the target program, and subsequently verifying of the modified version as being in a trusted state based on the new trusted hash code.

* * * * *